United States Patent [19]
Guerrier et al.

[11] Patent Number: 5,968,387
[45] Date of Patent: Oct. 19, 1999

[54] COOKING APPLIANCE INCLUDING A HOTPLATE AND A COOKING VESSEL

[75] Inventors: Didier Guerrier, Bloye; Guy Houin, Rumilly, both of France

[73] Assignee: Seb S.A., France

[21] Appl. No.: 08/891,061

[22] Filed: Jul. 10, 1997

[30] Foreign Application Priority Data

Jul. 11, 1996 [FR] France .................................. 96 08693

[51] Int. Cl.[6] .............................. A47J 37/06; A47J 27/02
[52] U.S. Cl. .................... 219/392; 219/396; 219/452.13; 219/455.11
[58] Field of Search ................................... 219/385, 386, 219/392, 393, 395, 396, 398, 443, 454, 459; 99/339, 423, 425, 446

[56] References Cited

U.S. PATENT DOCUMENTS

| Re. 22,176 | 9/1942 | Russell et al. ........................... 219/454 |
|---|---|---|
| 2,664,490 | 12/1953 | Allgeyer .................................. 219/454 |
| 3,805,688 | 4/1974 | Gvozdjak .................................. 99/425 |
| 3,947,657 | 3/1976 | Ershler ........................................ 9/458 |
| 4,108,055 | 8/1978 | Simmons .............................. 99/421 H |
| 4,516,485 | 5/1985 | Miller . | 
| 4,598,634 | 7/1986 | Horn, II ..................................... 99/340 |
| 4,641,015 | 2/1987 | Mayeur ..................................... 219/386 |
| 4,862,795 | 9/1989 | Hawkins .................................... 99/446 |
| 5,445,066 | 8/1995 | Rosset ....................................... 99/446 |
| 5,456,163 | 10/1995 | Ceravolo .................................... 99/446 |
| 5,682,809 | 11/1997 | Harrison .................................... 99/339 |

FOREIGN PATENT DOCUMENTS

| 0151894 | 8/1985 | European Pat. Off. . |
|---|---|---|
| 2704306 | 10/1994 | France . |
| 455197 | 6/1967 | Switzerland . |
| 602071 | 7/1978 | Switzerland . |
| 609854 | 3/1979 | Switzerland . |
| 2080097 | 2/1982 | United Kingdom . |

Primary Examiner—Joseph Pelham
Attorney, Agent, or Firm—Banner & Witcoff, Ltd.

[57] ABSTRACT

A cooking appliance includes a hotplate disposed above heating elements fixed to a frame, the hotplate including one or more openings for fat to pass through during cooking, and a container for collecting fat and juice during cooking disposed substantially in line with the opening(s) in the hotplate. The collecting container and the heating elements are in substantially the same plane substantially parallel to the hotplate. A free space between the plane and a base of the appliance accommodates a cooking container under the heating elements.

11 Claims, 2 Drawing Sheets

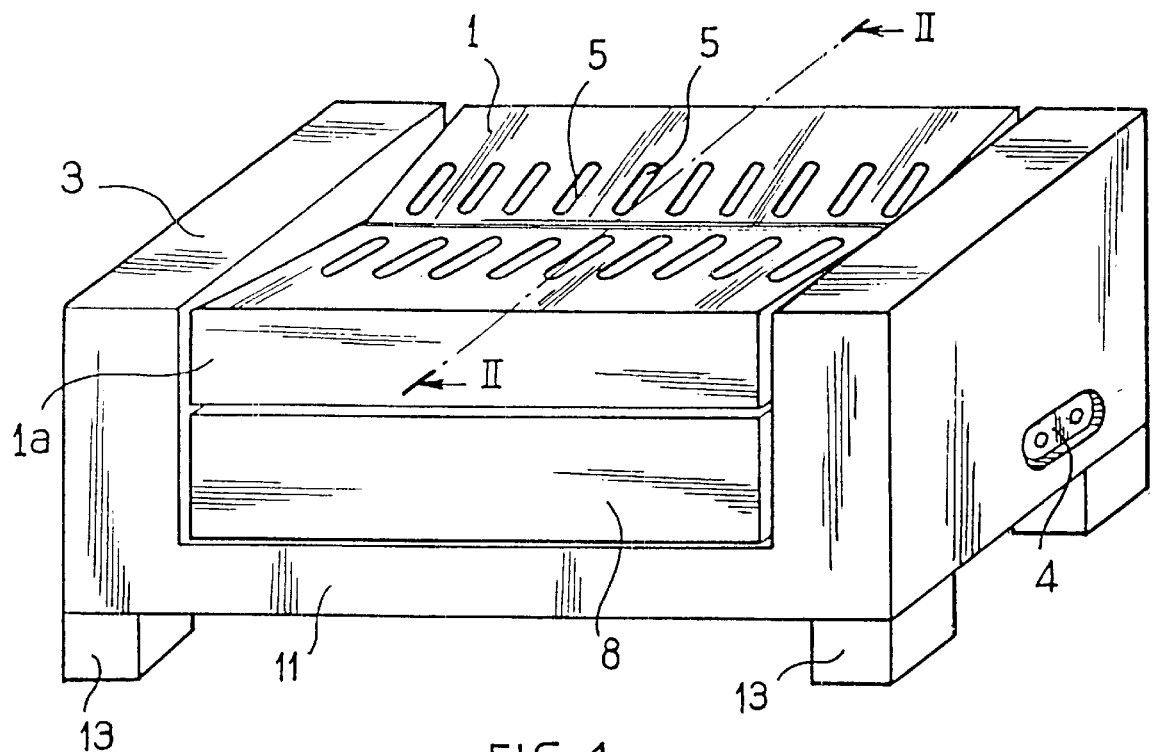
FIG_1
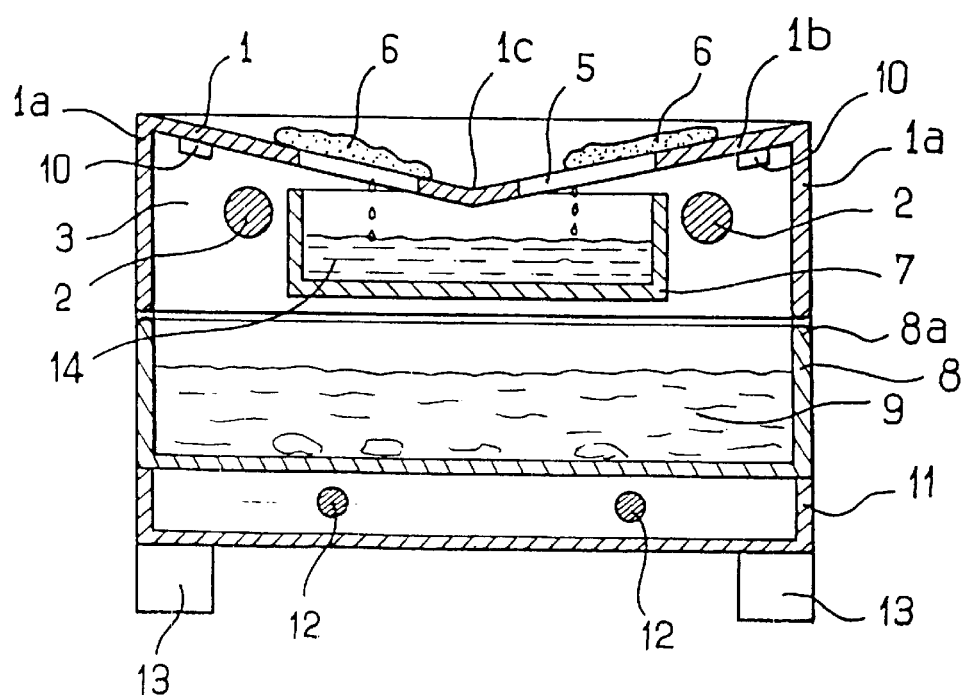
FIG_2

COOKING APPLIANCE INCLUDING A HOTPLATE AND A COOKING VESSEL

BACKGROUND OF THE INVENTION

1. Field of the Invention

The present invention concerns a cooking appliance including a hotplate disposed above heating elements to cook foods, especially meat.

A cooking appliance of this type has only one cooking function, in other words it can be used only to cook foods placed on the hotplate.

2. Description of the Prior Art

This type of cooking appliance is described in French patent FR 93 04 688. In a manner that is known in itself, the hotplate has openings through which fat and juice pass during cooking to be collected in a container disposed substantially in line with the openings in the plate.

The collecting container, the heating elements and the hotplate are therefore stacked one above the other on the base of the appliance.

This appliance is designed to be used indoors or outdoors and to enable each diner to cook their own food. If required, the cooking appliance can be placed in the middle of a table.

However, it is common to provide accompaniments (vegetable, sauces, etc) to complete the meal based on the foods cooked on the hotplate. It is then necessary to use other cooking appliances or to encumber the table with other containers to contain the accompaniments.

An aim of the present invention is to overcome the aforementioned drawbacks and to propose a cooking appliance enabling different methods of cooking foods to be used simultaneously.

SUMMARY OF THE INVENTION

The invention consists in a cooking appliance including a hotplate disposed above heating elements fixed to a frame, said hotplate including one or more openings for fat to pass through during cooking, and a container for collecting fat and juice during cooking disposed substantially in line with said opening(s) in said hotplate, said collecting container and said heating elements being in substantially the same plane substantially parallel to said hotplate, a free space between said plane and a base of said appliance being adapted to accommodate a cooking container under said heating elements.

Accordingly, the heating elements heat the hotplate to cook the foods on it and cook the foods disposed in the cooking container under the heating elements.

Despite the disinclination to have the collecting container near the heating elements, we have found that disposing the collecting container in the same plane as the heating elements does not significantly increase the combustion of fat or the generation of smoke, especially if a sufficient quantity of cooling water is poured into the collecting container.

The space left free in this way between the base of the appliance and the heating elements can be used for the cooking container for cooking or keeping warm foods such as vegetables, sauces, etc.

This cooking appliance can therefore be used to cook a complete meal, if required on a table surrounded by diners.

In an advantageous version of the invention the hotplate and the collecting container are removably disposed on the frame, the cooking container sliding under the hotplate.

This arrangement enables the cooking container to be introduced and withdrawn independently of the hotplate and the container for collecting fat.

In a preferred version of the invention, the base of the appliance includes additional heating elements adapted to heat the cooking container.

The latter is therefore heated from above by cooking elements disposed under the hotplate and from below by additional heating elements disposed in the base of the appliance.

Other features and advantages of the invention will emerge from the following description given by way of non-limiting example with reference to the accompanying drawings.

BRIEF DESCRIPTION OF THE DRAWINGS

FIG. 1 is a perspective view of a cooking appliance in accordance with the invention.

FIG. 2 is a sectional view taken along the line II—II in FIG. 1.

DETAILED DESCRIPTION OF THE PREFERRED EMBODIMENTS

Figure 3:
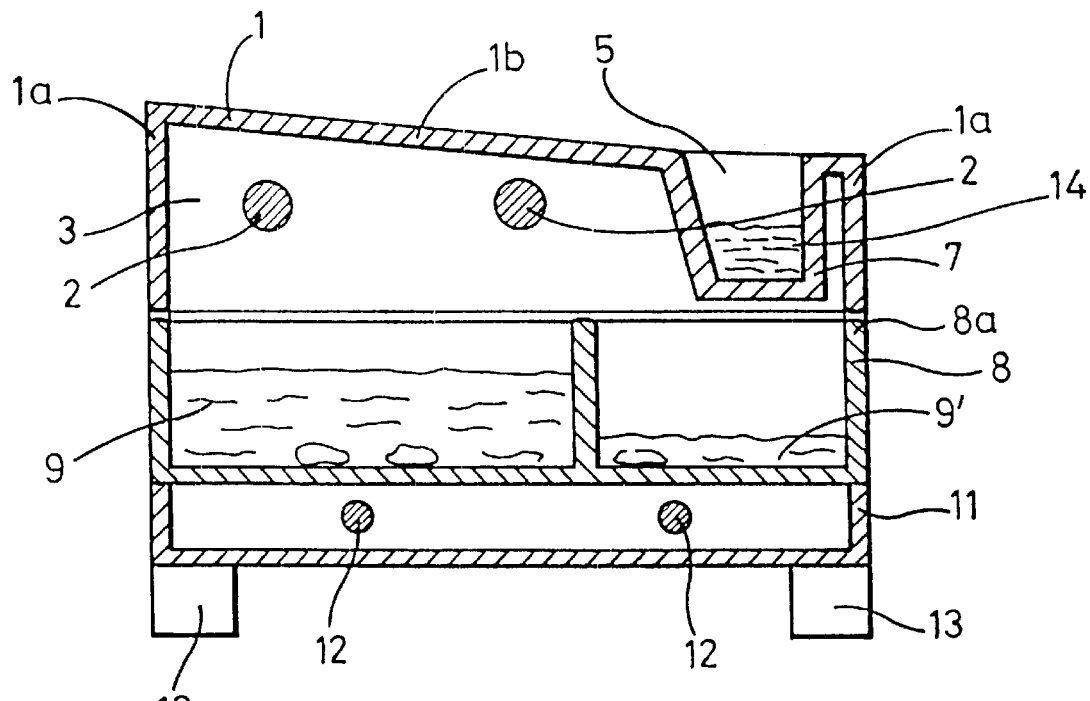
FIG. 3 is a sectional view similar to FIG. 2 of a second embodiment of an appliance in accordance with the invention.

As shown in FIGS. 1 and 2, the cooking appliance includes a hotplate 1 disposed above heating elements 2 fixed to a frame 3. In this embodiment the heating elements are electrical resistors supplied with electric current via a connector 4 into which a removable electrical power cord (not shown) can be plugged.

The hotplate 1 includes openings 5 through which pass fat and juice flowing out of food 6 while it is being cooked on the hotplate.

In this example, the plate 1 includes a series of identical orifices 5 regularly distributed along a longitudinal direction of the plate 1.

A collecting container 7 is disposed substantially in line with the openings in the hotplate.

As shown in FIG. 2, the collecting container 7 and the heating elements 2 are in substantially the same plane, parallel to and below the hotplate 1.

The free space between this plane and the base of the appliance is adapted to accommodate a cooking container 8 under the heating elements 2. Foods 9 such as vegetables, sauces, etc can thus be cooked in the cooking container 8 by the heating elements 2.

In this embodiment the hotplate 1 and the collecting container 7 are removably disposed on the frame 3. Shoulders 10 on opposite sides of the frame 3 support the hotplate on the frame 3. A similar system can be provided to support the collecting container 7.

The cooking container 8 slides under the hotplate 1, in the space between the collecting container 7 and the base 11 of the frame 3 of the appliance.

As an alternative to this, the hotplate 1 and the collecting container 7 could also be removably disposed on the cooking container 8.

The base 11 of the appliance preferably includes additional heating elements 12 adapted to heat the cooking container 8. These additional heating elements 12 can also be electric heating resistors.

The cooking container 8 is therefore heated by the heating elements 2 in the top part of the appliance and by the heating elements 12 in the bottom part.

The heating elements 2 are near and parallel to two opposite sides 1a of the hotplate 1, the collecting container 7 being disposed between the heating elements 2.

The aforementioned opposite sides 1a are preferably the longer sides of the hotplate 1.

This arrangement of the heating elements 2 achieves even distribution of the temperature of the hotplate 1.

The latter has a top face 1b adapted to receive foods 6, this top face 1b having at least one inclined portion, the lowest portion 1a of this inclined portion corresponding to the region of the hotplate 1 provided with the openings 5 in line with the collecting container 7.

Accordingly, the juice and fat flowing out of the food 6 while it is cooking flow down the inclined plane formed by the top face 1b of the hotplate 1 to the area provided with the openings 5, through the openings 5 and into the collecting container 7. The latter is preferably filled with water 14 to prevent recombustion of the collected juice and fat.

In this embodiment, the hotplate has a top face 1b with two inclined portions that are adjacent in their lowest area 1c.

The top face 1b of the hotplate therefore has a V-shape widthwise cross-section.

The openings 5 are in the area defined by the point of the V-shape, the collecting container 7 extending lengthwise of the hotplate 1, along its center.

The edges of the hotplate 1 preferably extend downwards, towards the base 11 of the appliance, to form a skirt surrounding and protecting the heating elements 2 and the collecting container 7.

These edges 1a forming a skirt have a lower edge that is almost in contact with the top edges 8a of the container 8, so as to form a substantially closed space above the cooking container 8. This arrangement confines the heat under the hotplate 1 and speeds up the cooking of the foods 9 in the cooking container 8.

Other embodiments are shown in FIGS. 2 and 3. Components common to the first embodiment will not be described again.

In these embodiments, the collecting container 7 is parallel to and adjacent an edge 1a of the hotplate 1.

The plate 1 includes a continuous opening 5 in line with the collecting container 7, the latter and the plate 1 forming a unitary assembly.

In the FIG. 3 embodiment, the heating elements 2 are disposed on the same side of the collecting container 7 which lies near the edge 1a of the plate 1.

The lowest area of a single inclined plane 1b leads into the collecting container 7.

In this embodiment, the cooking container 8 is compartmented so that different types of accompaniment 9, 9' can be cooked or kept warm separately.

The container 8 could equally well be replaced by a plurality of adjacent containers.

Figure 4:
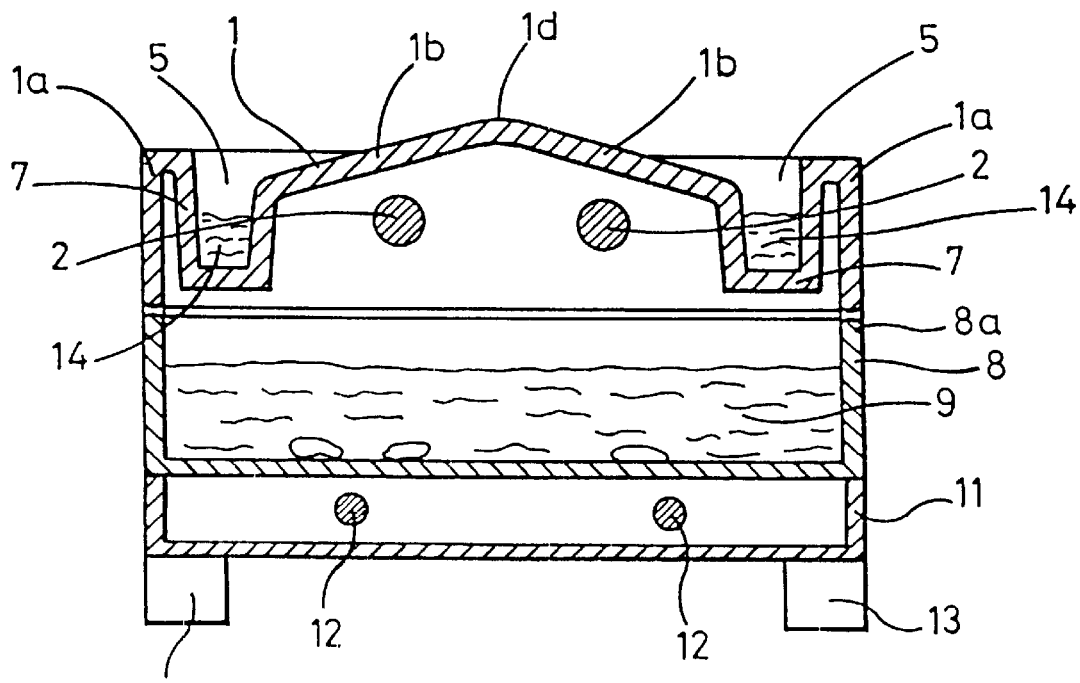
FIG. 4 is a sectional view similar to FIG. 2 of a third embodiment of an appliance in accordance with the invention.

In the FIG. 4 embodiment, the hotplate 1 has a top face 1b made up of two inclined portions 1b the lowest areas of which are adjacent respective opposite edges 1a of the hotplate 1.

Two collecting containers 7 extend parallel to and adjacent opposite edges 1a of the plate 1, the heating resistors 2 being disposed between the collecting containers 7.

Of course, many modifications could be made to the embodiment described hereinabove without departing from the scope of the invention.

The heating elements 2 can equally well be gas burners.

In these embodiments, the feet 13 of the cooking appliance are small and enable the appliance to be placed on a table surrounded by diners.

Of course, these feet 13 could be replaced by a larger stand adapted to support the appliance directly on the floor or on the ground.

There is claimed:

1. A cooking appliance including a hotplate disposed above electrical resistors fixed to a frame, said hotplate including at least one opening for fat to pass through during cooking, and a container for collecting fat and juice during cooking disposed substantially in line with said at least one opening in said hotplate, said collecting container and said electrical resistors being in substantially the same plane and substantially parallel to said hotplate, and a free space between said plane and a base of said appliance being adapted to accommodate a cooking container under said electrical resistors.

2. The cooking appliance claimed in claim 1 wherein said hotplate and said collecting container are removably disposed on said frame; and said cooking appliance further includes the cooking container which is capable of sliding under said hotplate.

3. The cooking appliance claimed in claim 1 further including the cooking container, and wherein said hotplate and said collecting container are removably disposed on said cooking container.

4. The cooking appliance claimed in claim 1 wherein said base of said appliance includes heating elements adapted to heat the cooking container.

5. The cooking appliance claimed in claim 1 wherein said electrical resistors are near and parallel to two opposite sides of said hotplate, said collecting container being disposed between said electrical resistors.

6. The cooking appliance claimed in claim 1 wherein said collecting container is parallel to and adjacent one side of said hotplate.

7. The cooking appliance claimed in claim 5 wherein said opposite sides of said plate are longer sides of said hotplate.

8. The cooking appliance claimed in claim 6 wherein said one side of said hotplate is a longer side of said hotplate.

9. The cooking appliance claimed in claim 1 wherein said hotplate has a top face adapted to receive foods and having at least one inclined portion, said at least one opening including a plurality of openings, and the lowest area of said inclined portion being provided with said plurality of openings disposed in line with said container for collecting fat and juices.

10. The cooking appliance claimed in claim 5 wherein said hotplate has a top face made up of two inclined portions adjacent in their lowest area.

11. The cooking appliance claimed in claim 6 wherein said hotplate has a top face made up of two inclined portions, lowest areas of which are adjacent opposite edges of said hotplate.

* * * * *